No. 795,087. PATENTED JULY 18, 1905.
C. ALONSO-PEREZ.
AMUSEMENT APPARATUS.
APPLICATION FILED NOV. 10, 1904.
6 SHEETS—SHEET 1.
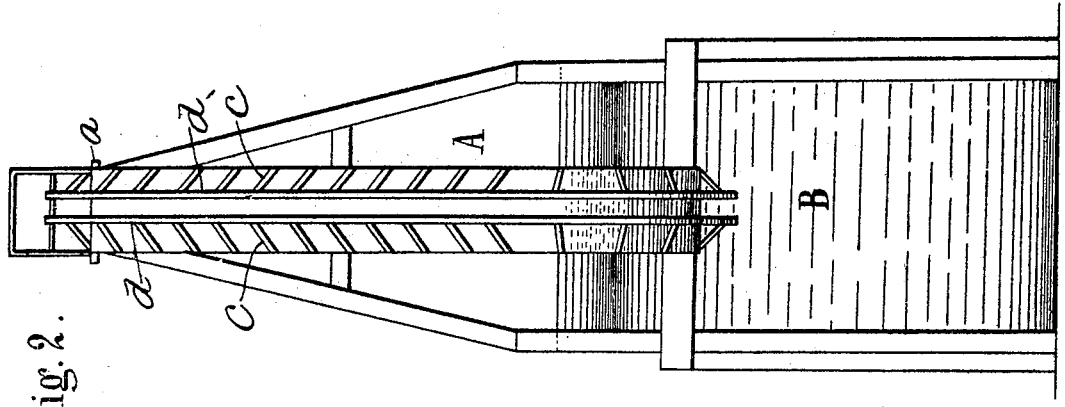
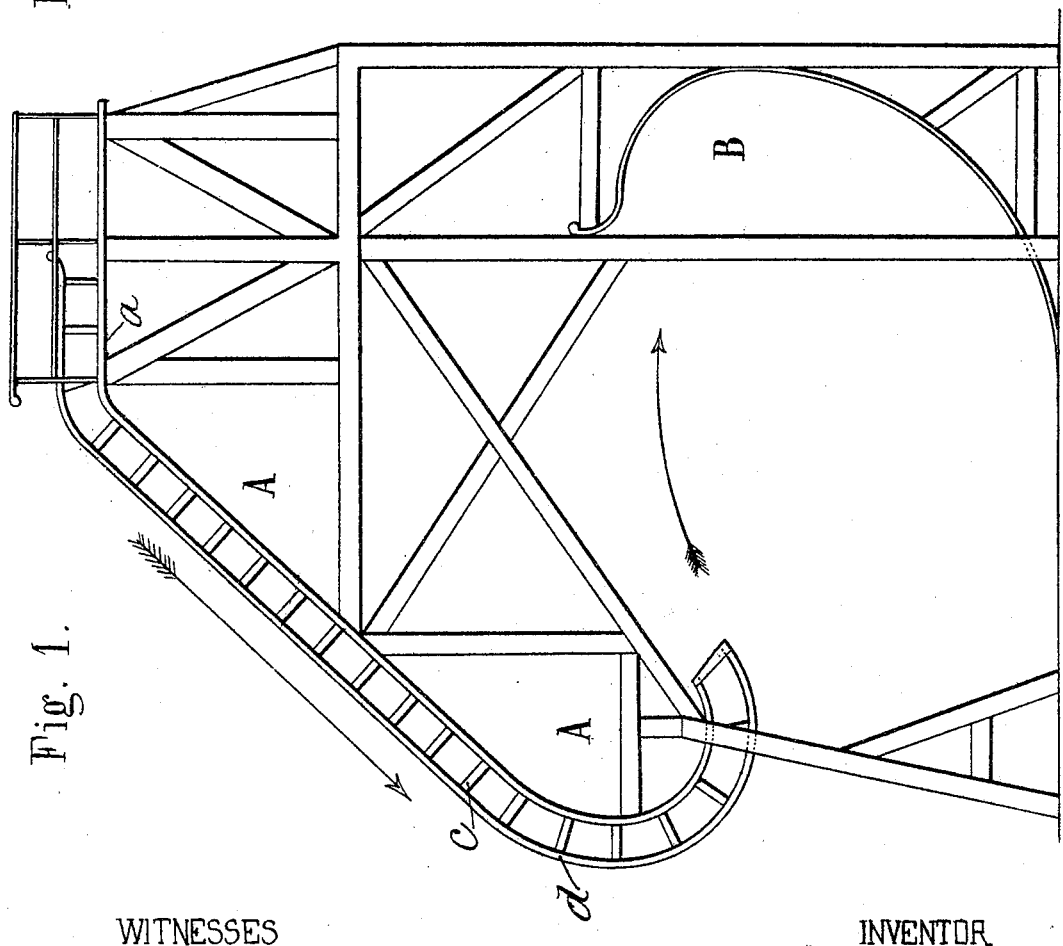
WITNESSES
Henry J. Suhrbier.
W. E. Stockwell
INVENTOR
Carlos Alonso-Perez
BY
Gomez Niles
ATTORNEYS No. 795,087. PATENTED JULY 18, 1905.
C. ALONSO-PEREZ.
AMUSEMENT APPARATUS.
APPLICATION FILED NOV. 10, 1904.
6 SHEETS—SHEET 2.
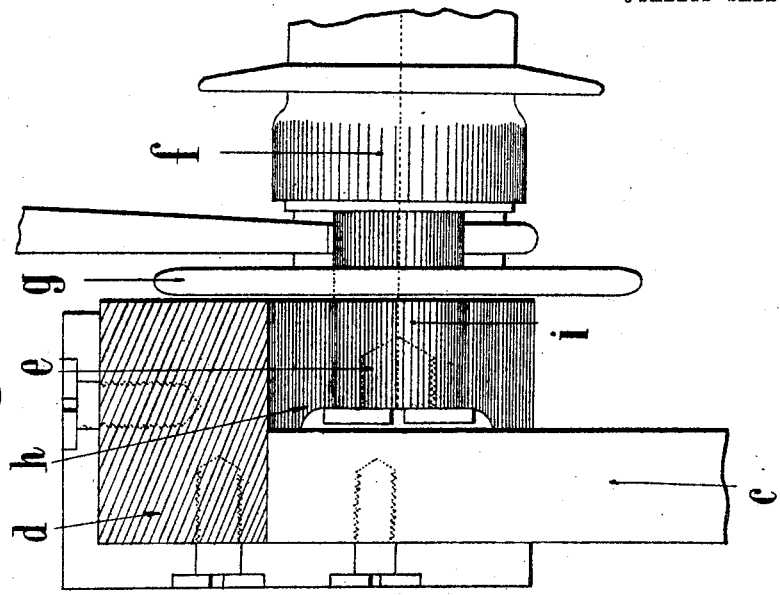
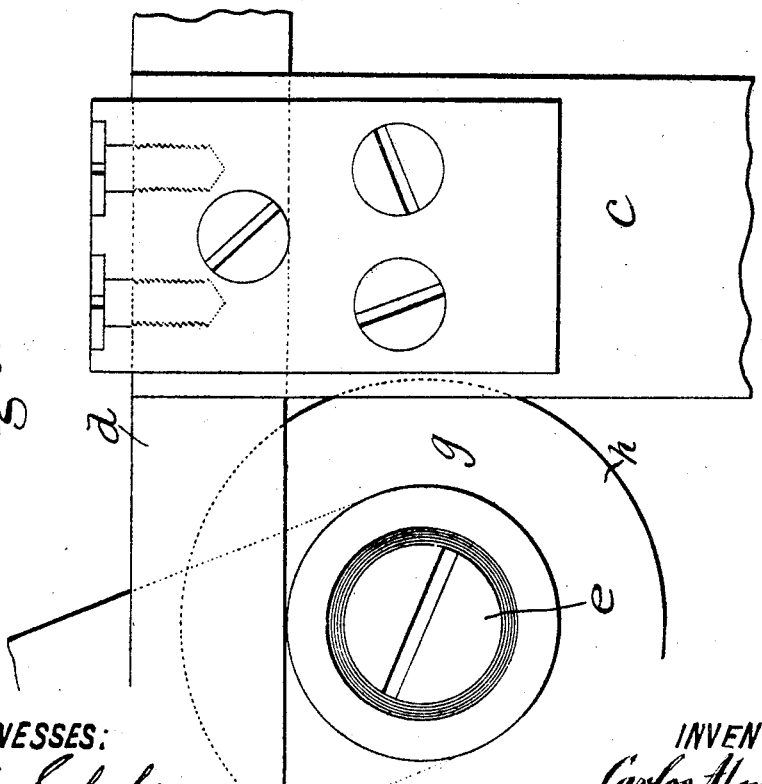
WITNESSES:
Henry J. Suhrhier.
INVENTOR
Carlos Alonso-Perez
BY
ATTORNEYS.

No. 795,087. PATENTED JULY 18, 1905.
C. ALONSO-PEREZ.
AMUSEMENT APPARATUS.
APPLICATION FILED NOV. 10, 1904.
6 SHEETS—SHEET 3.
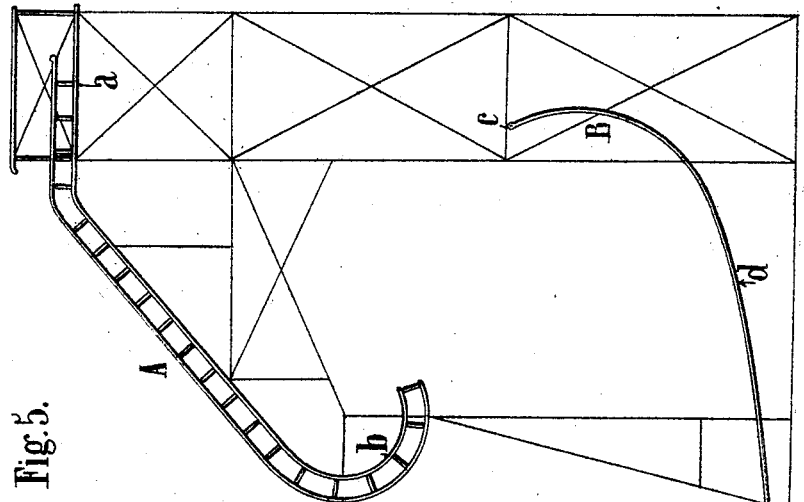
Fig. 5.
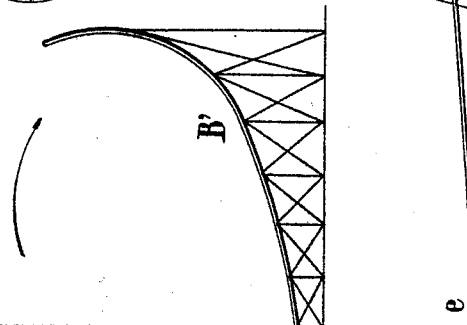
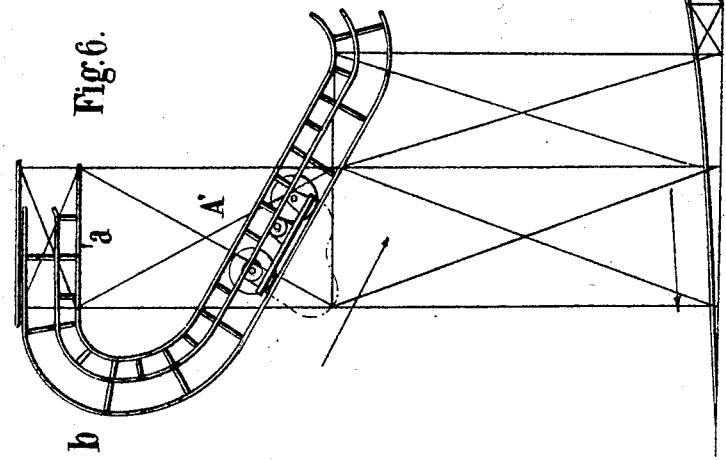
Fig. 6.
WITNESSES:
Henry J. Suhrher
W. Stockwell
INVENTOR
Carlos Alonso-Perez
BY
James Nile
ATTORNEYS.

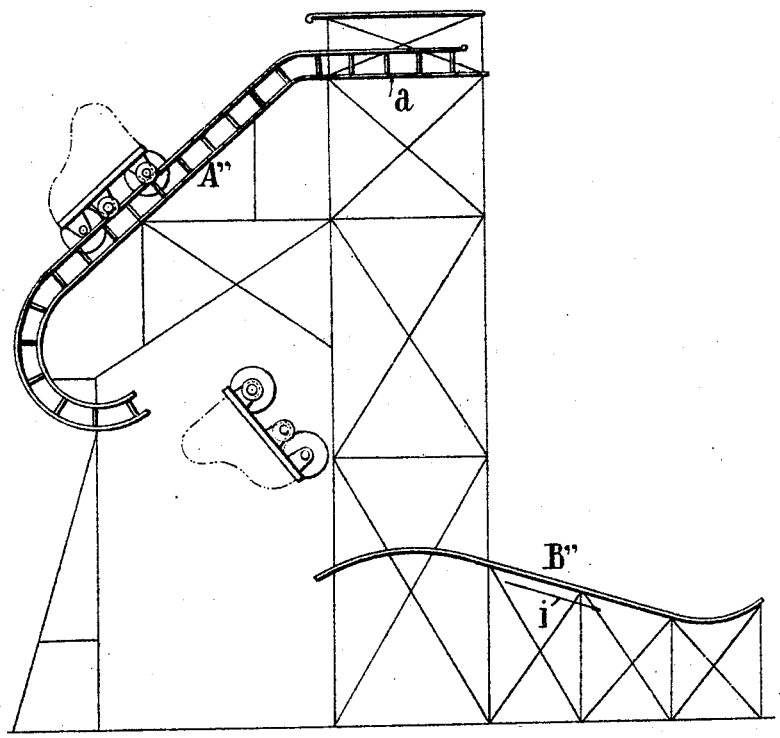

No. 795,087. PATENTED JULY 18, 1905.
C. ALONSO-PEREZ.
AMUSEMENT APPARATUS.
APPLICATION FILED NOV. 10, 1904.

6 SHEETS—SHEET 5.

WITNESSES

INVENTOR
Carlos Alonso-Perez
BY
ATTORNEYS

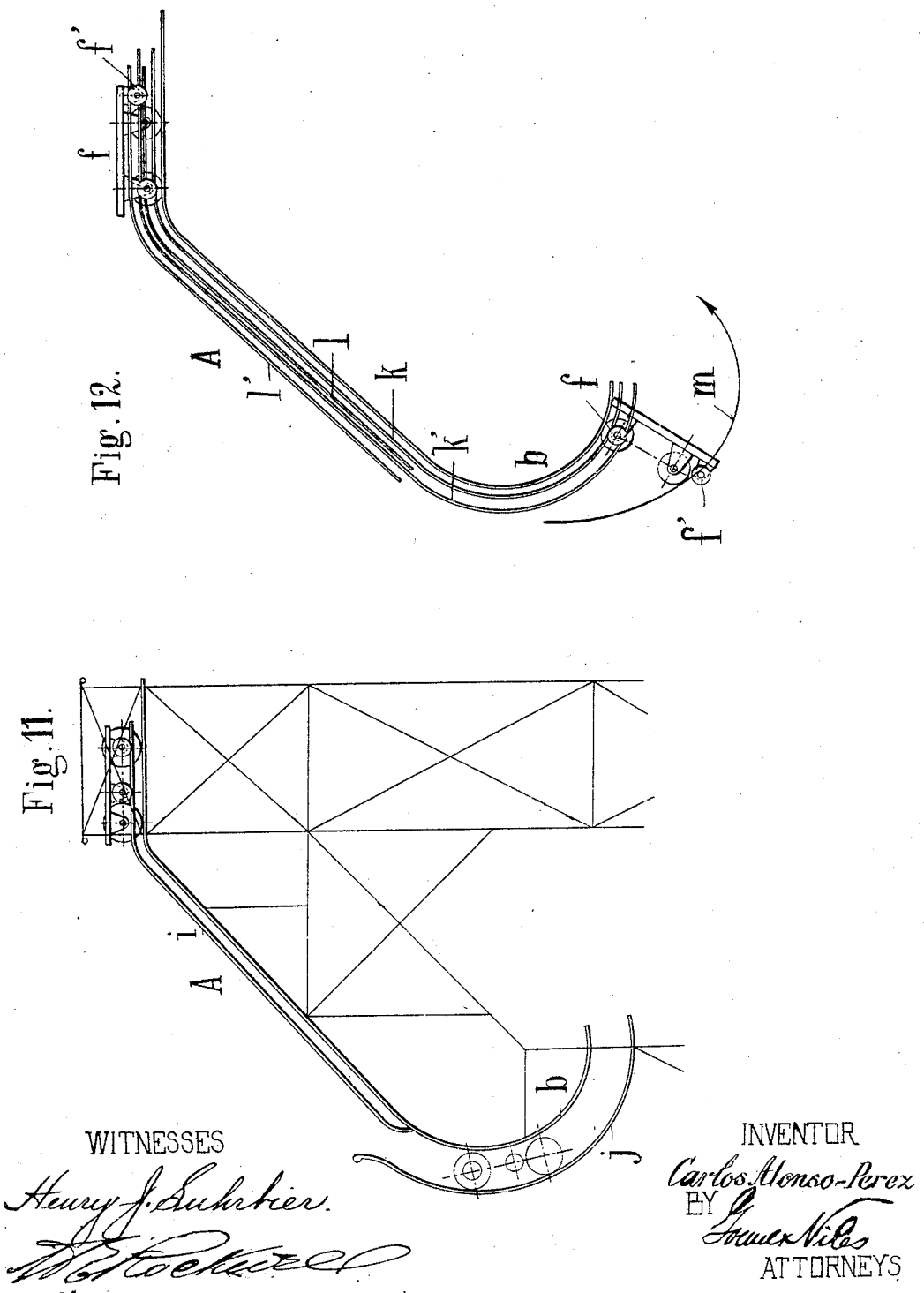

No. 795,087.  
Patented July 18, 1905.

UNITED STATES PATENT OFFICE.

CARLOS ALONSO-PEREZ, OF PARIS, FRANCE, ASSIGNOR TO THE BARNUM & BAILEY COMPANY, LIMITED, OF NEW YORK, N. Y., A CORPORATION OF ENGLAND.

AMUSEMENT APPARATUS.

SPECIFICATION forming part of Letters Patent No. 795,087, dated July 18, 1905.

Application filed November 10, 1904. Serial No. 232,100.

*To all whom it may concern:*

Be it known that I, CARLOS ALONSO-PEREZ, a subject of the King of Spain, and a resident of Paris, France, have invented a new and useful Amusement Apparatus, which apparatus is fully set forth in the following specification.

This invention relates to amusement apparatus, such as used in circuses or similar institutions of amusement; and among the objects of the invention is the provision of an apparatus of this type in which a suitable vehicle adapted to carry one or more performers is set in rapid motion and forced to describe a complete somersault in the air.

A further object of the invention is to provide an amusement apparatus embodying a track or runway having a downwardly and backwardly directed curved or bent portion over which the vehicle is caused to move while in substantially inverted position.

The invention also contemplates the provision of an apparatus of the type mentioned in which the vehicle after passing over the track referred to is received and righted by a runway spaced from the same, the steering of the vehicle while moving over said track and through the space or gap between the same and said runway being unnecessary.

With these and other ends in view the invention consists in an apparatus embodying the novel features and combinations of parts to be hereinafter described, and finally pointed out in the claims.

Figure 9:
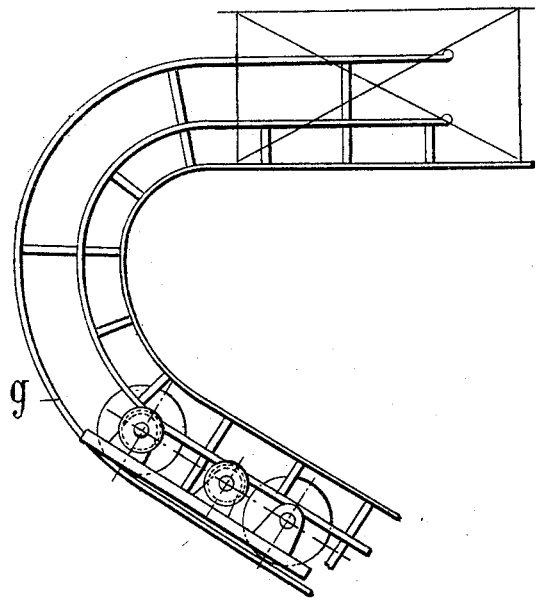
Figure 8:
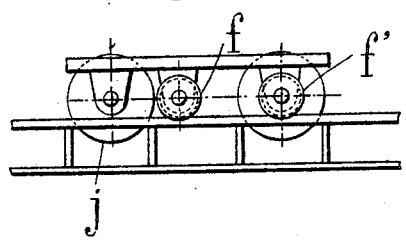
Figure 10:
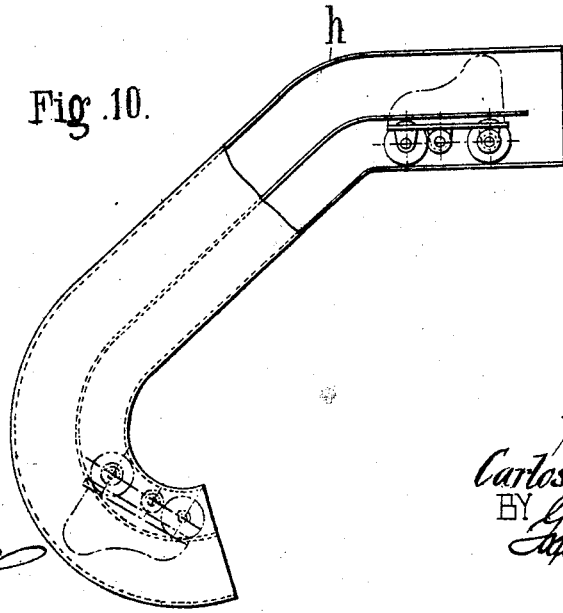

In the accompanying drawings, Figure 1 is a side elevation of an amusement apparatus constructed in accordance with the invention and designed for use in connection with a bicycle. Fig. 2 is a front elevation of the same. Figs. 3 and 4 are detail views drawn on a larger scale, showing in side and front elevation, respectively, the means for retaining the bicycle in contact with the first track or runway. Fig. 5 is a side elevation of an apparatus for use with a motor-car or similar vehicle. Figs. 6 and 7 are side elevations of modifications of the apparatus, also designed for use with a motor-car. Fig. 8 is a detail side elevation of the rolling device for the vehicle. Fig. 9 is a detail side elevation of a portion of one form of track, showing the coöperation of said rolling device therewith. Figs. 10 and 11 are side elevations of modified forms of the track employed, and Fig. 12 is a side elevation of a further modified form of track.

Similar characters of reference denote corresponding parts throughout the several views.

The improved apparatus comprises in its essential features an inclined track A, formed at its upper end into a suitable platform $a$, from which the vehicle—such as a bicycle, motor-car, or imitation motor-car—commences its downward flight over said track. This track, which from its function might be termed the "projecting-track," is provided with a downwardly and backwardly directed curved portion, either adjacent the lower end thereof, as shown in Figs. 1, 2, 5, 7, 10, 11, and 12, or at the intermediate portion thereof, as shown in Figs. 6 and 9, and is preferably disposed in a single vertical plane, as shown in Fig. 2. In said plane and spaced from the lower end of the inclined track A is arranged a receiving-runway B, having substantially the shape of a semicircle $c\ d$ standing on end or in case of a modified construction of track or vehicle of the form shown in Fig. 7. Where the receiving-runway is of semicircular form, it is either connected directly with the ground by an inclined plane, such as $d\ e$ in Fig. 5, or rises again in a gradual curve in order to reduce the speed of the vehicle which is received thereby from the projecting-track, upon the curved and inverted portions of which the vehicle is retained by means to be presently described. The track A and runway B thus constitute in most of the forms shown a runway having essentially the form of an upright S, which is interrupted below the upper curve or bend therein by a break or gap through which the descending vehicle is adapted to pass at a high rate of speed while in substantially inverted position after having rounded the outside of said upper curve. This track structure or runway is supported by suitable framework, as indicated in the drawings, which renders the same absolutely rigid.

Referring particularly to Figs. 1 and 2, which show an apparatus designed especially for use in connection with a bicycle, it will be seen that the track A is inclined at such an angle as to produce a steep gradient and is provided with spaced upright supports c, which extend in parallel longitudinally-extending rows from the platform a to the lower end of said track. Upon the upper ends of said supports are mounted in any suitable manner parallel longitudinally-extending rails d, between which the bicycle is adapted to pass. The spindles or axles of the bicycles are of greater diameter than those used ordinarily, and each is provided outside of the hub and fork with a thin roller g and an outer roller h of greater thickness, but less diameter, as shown in Figs. 3 and 4. The rollers h are preferably of the same width as the rails d and are adapted to travel in contact therewith, while the rollers g act in the capacity of guiding-flanges, a screw e, which is screwed into each end of each spindle, serving to prevent play and detachment of the parts. It is obvious that the rails d of the track A should be spaced from the base or floor portion of the same at such a distance as to properly retain the wheels of the bicycle between said rails and said floor portion. The runway B is designed to receive the bicycle after its flight through the air and as it is necessary to steer the bicycle thereon is of greater width than the projecting-track. Said runway is preferably provided from the top to the level of the ground with canvas padded with wool, horsehair, or other material in order to lessen the shock. In this form of the apparatus the bicycle starts from the platform a, follows the direction of the track A, and owing to the momentum acquired passes through the gap between the track and runway in inverted position, the wheels then coming in contact with the runway B, which rights the bicycle and conducts the same to the ground.

The other modifications of the apparatus shown are designed for use in connection with a motor-vehicle or imitation motor-vehicle, and in this case a track similar in many respects to that previously described is used, the rails being spaced apart at the proper distance for accommodating the vehicle, which is preferably of the four-wheeled type, being provided with steering-gear, &c. The rollers by means of which the vehicle is guided on the projecting-track are preferably arranged as shown in Fig. 8, where they are designated by reference characters $f$ and $f'$. In addition to the rails d the track A is sometimes provided with longitudinally-extending bars g, as shown in Fig. 9, which are arranged along the path of the wheels, so that when the vehicle, which in this case travels on the rails, reaches the downwardly and backwardly directed curve in said track the wheels roll on said bars, and the vehicle is thereby prevented from leaving the track before reaching the end of the same, which it would otherwise do by reason of the force of gravity acting thereon.

In the modification shown in Fig. 10 the projecting-track is constituted by a tunnel h of the characteristic form, upon the base of which the wheels of the vehicle travel, said vehicle being provided with rollers and retained against the base or floor of the tunnel by longitudinally-extending rails, between which and said floor said rollers travel. This arrangement is very effective, as the vehicle is invisible until it is projected from the tunnel in inverted position onto the runway B, which receives and rights the same. The wheels of the vehicle also travel directly over the floor in the modifications shown in Figs. 5 and 11, the vehicle being guided by rollers traveling under rails which guide it on the inclined portion of the track and prevent its leaving the latter at the downwardly and backwardly directed curve thereof.

In case the downward and rearward bend or curve in the projecting-track is formed at the intermediate portion thereof, as shown in Figs. 6 and 9, the vehicle travels a comparatively long distance while inverted before being projected at the lower end of the track, which is preferably upturned slightly, as shown in Fig. 6, into the gap and onto the runway B', which returns the vehicle to normal position.

In Fig. 7 is shown an apparatus in which the car rights itself in the gap or space between the track A'' and runway B'' without the aid of the latter, which simply serves to receive the same and to conduct it in the direction of the arrow $i^x$. The turning over of the car during the jump is effected by longitudinally spacing the rollers $f$ and $f'$ at a suitable distance, the wheels $j$ at the front of the vehicle overhanging or not, as desired.

The following arrangement may also be adopted for guiding the car and holding the same on the curved and backwardly-directed portion of the track. The straight portion of said track is provided with rails $i$, as shown in Fig. 11, on which the rollers $f$ and $f'$ of the vehicle travel, said rails being interrupted at the lower end of the straight portion. After passing beyond the rails $i$ the vehicle is guided and maintained on the portion b by bars j of suitable cross-section, which describe a curve parallel to that of the base or floor of the portion b. During the passage of the vehicle over the latter it is supported by the rotation of the wheels against the bars j, as will be readily understood.

In the apparatus illustrated in Fig. 12 the turning over of the vehicle is effected by a particular construction of the projecting-track, which for this purpose is provided with two pairs of rails $l\ l'$ and $k\ k'$, which are either arranged in one and the same plane or one slightly above the other, as shown. The rails $l\ l'$ extend, however, from the platform only to the upper end of the curved lower portion of the track. The rollers $f'$ at the front of the vehicle roll on these outer rails $l\ l'$, while the rear rollers $f$ roll on the inner rails $k\ k'$. It is manifest, therefore, that when the vehicle passes beyond the rails $l\ l'$ the front rollers will be released and owing to the influence of gravity and to the momentum acquired will describe a curve such as indicated by the arrow $m$, thus beginning a somersault, which is completed when the rear rollers $f$ are released by the rails $k\ k'$, which engage the same throughout the length of the track. After describing a complete somersault in the air the car falls upon a runway, such as that shown in Fig. 7.

Having thus described my invention, I claim as new and desire to secure by Letters Patent—

1. In an amusement apparatus, an inclined track or runway having a rearward bend or curve therein and disposed in a single vertical plane, and a second runway spaced from the first and disposed in said plane.

2. In an amusement apparatus, an inclined track or runway having a downwardly and backwardly directed curve therein, and a second runway spaced from the lower end thereof.

3. In an amusement apparatus, an inclined track or runway provided with a downwardly and backwardly directed curve and disposed in a single vertical plane, and a second runway spaced from the first and disposed in said plane.

4. In an amusement apparatus, an S-shaped runway having an intermediate gap therein.

5. In an amusement apparatus, an upright S-shaped runway having a break or gap therein.

6. In an amusement apparatus, a runway formed in essentially the shape of an upright S having a gap below the upper bend or curve thereof.

7. In an amusement apparatus, an upright S-shaped runway having an intermediate gap therein and provided above said gap with rails spaced from the base or floor thereof.

8. In an amusement apparatus, an inclined track having a downwardly and rearwardly directed curve therein, longitudinally-extending rails spaced from the base or floor of said track, and a runway spaced from the lower end of said track.

9. An amusement device comprising a track in the form of an upright S having a break or gap therein, a vehicle movable over said track, and means for retaining said vehicle on said track while rounding the outside of one of the curves thereof, and for directing the same across said gap.

10. The combination, with the track or runway in the form of an upright S having a gap therein, of the vehicle movable over said runway, and the means above said gap for retaining said vehicle on said runway.

11. An amusement apparatus comprising an inclined track, a vehicle guided along said track, and a runway spaced from the lower end of the latter.

12. An amusement apparatus comprising in its construction an inclined track having a downwardly and backwardly directed curve, a vehicle movable over said track, means for retaining said vehicle on the latter, and means spaced from the lower end of said track for receiving said vehicle.

13. In an amusement apparatus, the combination, with an inclined track having a downwardly and backwardly directed curve therein, of a vehicle guided along said track, means for retaining said vehicle on said curved portion, and a runway spaced from said track and adapted to receive said vehicle.

14. An amusement apparatus including a projecting-track having a downward and rearward bend, a vehicle movable over said track, and means spaced from said track for receiving said vehicle.

15. An amusement apparatus including a projecting-track having a downward and rearward bend, a vehicle movable over said track, and means spaced from the latter for receiving and righting said vehicle.

16. In an amusement apparatus, in combination, an inclined track having a downward and rearward bend, a vehicle guided along said track, and a runway spaced from the lower end of the latter and adapted to receive and right said vehicle.

17. In an amusement apparatus, the combination, with an inclined track having a downwardly and backwardly directed curve therein, of a vehicle guided along said track, means for retaining said vehicle on the latter at said curve, and a semicircular runway spaced from the lower end of said track.

18. An amusement apparatus, comprising an inclined track having an inward bend, a vehicle movable over said track and carrying wheels or rollers, means bearing on said wheels or rollers for maintaining said vehicle against said track when the former is in inverted position at said bend, and a second track spaced from the first and adapted to receive said vehicle.

19. An amusement apparatus, comprising a track of essentially S shape interrupted below the upper bend in the same, a vehicle movable over said track, and means for retaining said vehicle on said track when the former is in inverted position.

In testimony whereof I have signed this specification in the presence of two subscribing witnesses.

CARLOS ALONSO-PEREZ.

Witnesses:
 ALONSO-PEREZ MARIANO,
 EMILE LEOBRET.